United States Patent [19]
Klimo

[11] 3,887,855
[45] June 3, 1975

[54] MOTOR SPEED MODIFIER CONTROL

[75] Inventor: Robert G. Klimo, Parma, Ohio

[73] Assignee: Cleveland Machine Controls, Inc., Cleveland, Ohio

[22] Filed: Nov. 28, 1973

[21] Appl. No.: 419,718

[52] U.S. Cl. ............... 318/332; 318/338; 318/433; 318/434
[51] Int. Cl. ............................................. H07p 5/16
[58] Field of Search .......... 318/257, 308, 332, 338, 318/432–434

[56] References Cited
UNITED STATES PATENTS

| | | | |
|---|---|---|---|
| 3,419,777 | 12/1968 | Asseo | 318/338 |
| 3,508,132 | 4/1970 | Peterson | 318/308 |
| 3,526,819 | 9/1970 | Graf | 318/332 |
| 3,665,274 | 5/1972 | Born | 318/257 |
| 3,716,772 | 2/1973 | Larson | 318/332 |
| 3,735,226 | 5/1973 | Pittner | 318/432 |

*Primary Examiner*—G. Z. Rubinson

[57] ABSTRACT

A D.C. reversible drive motor is operated by a motor control system to control motor speed in dependence upon an error signal, representing a given relationship between an actual motor speed signal and a desired reference signal. If the motor operates in a regenerative mode and the actual motor speed exceeds that required for the available torque, a speed modifier control circuit operates to effectively modify the speed reference signal. This causes the motor speed to decrease so that the speed-torque relationship is maintained within prescribed limits.

13 Claims, 4 Drawing Figures

MOTOR SPEED MODIFIER CONTROL

This invention relates to the art of motor drive control systems and, more particularly, to an improved system for modifying or overriding a speed reference control signal during motor regenerative conditions to control motor speed within desired speed-torque limits.

The invention is particularly applicable for use in conjunction with hoist or crane motor drive control systems and is described with particular reference thereto; although, it is to be appreciated that the invention may be employed in various applications requiring motor speed control during overhauling conditions to prevent motor speed from exceeding desired speed-torque limitations.

Various motor control applications, such as those in conjunction with hoists and cranes employ D.C. motors which operate in a field weakened speed range and have available torque in all directions proportional to the product of the armature current and the field current. Typically, such motors are controlled by a motor speed control circuit such as a Ward-Leonard or a similar control circuit whereby the motor speed is controlled as a function of the difference between a motor speed signal, obtained as with the use of a tachometer generator, and a motor speed reference signal. At speeds above the base speed of the motor, the available torque is reduced because the field current is less than that normally employed at the base speed.

If such a motor is employed for operating a hoist or crane, the developed torque at zero speed is proportional to the tension in the cable and/or the weight of the load. If the torque is 100% at standstill, the maximum lifting rate will be 100% speed and the maximum lowering rate will be 100% speed. If, however, the operator exceeds 100% speed in lowering the load, the available torque will be reduced because the field current will be less than that for base speed. The crane may lose control since the load will accelerate in a downward direction under the influence of gravity and will not stop until it strikes ground. Consequently, it is desirable during such overhauling conditions that means be provided to prevent the crane lowering speed from exceeding that for the available torque to prevent such a run away condition.

A primary object of the present invention is to provide speed modification control for controlling an overhauling D.C. motor to limit the speed of the motor within the desired speed-torque relationship.

It is a still further object of the present invention to provide such speed modifying control wherein the load is, in effect, weighed to determine the torque required to support the load and the motor speed is limited in dependence upon the required torque.

It is still a further object of the present invention to provide such speed modification control for a D.C. motor employed in a hosit or crane environment or similar environment wherein the speed modification control is employed only during motor overhauling conditions over a field weakened speed range.

It is a still further object of the present invention to achieve motor speed control of a D.C. motor operating in a field weakened speed range during overhauling by varying the speed reference signal applied to the motor speed control circuit such that the modified speed control signal operates to decrease the motor speed when the motor speed exceeds that required for the available torque.

In accordance with the invention, a motor control system is provided for a D.C. motor which exhibits available torque over a motor speed range and within a desired speed-torque relationship. A motor speed signal is provided and is representative of actual motor speed. A speed reference signal is provided and is representative of desired motor speed. A motor speed control serves to control the energization of the motor to operate at a speed in dependence upon a giving relationship of the speed signal and the reference signal. A speed modifier control operates to modify the reference speed signal to reduce the motor speed when the motor operates in a field weakened speed range and the available torque is less than that required to be within the desired speed-torque relationship.

In accordance with a more limited aspect of the present invention, the motor torque is measured by sensing the motor armature and field currents and then obtaining an output signal which is proportional to the product of the signals and, hence, to the available motor torque.

In accordance with a still further aspect of the present invention, a function generator circuit provides a control signal which has a constant magnitude for a desired speed range up to 100% of motor speed and then varies inversely with motor speed.

DESCRIPTION OF THE DRAWINGS

The foregoing and other objects and advantages of the invention will become more readily apparent from the following description of the preferred embodiment of the invention as taken into conjunction with the accompanying drawings which are a part hereof and wherein.

DESCRIPTION OF PREFERRED EMBODIMENTS

Figure 1:
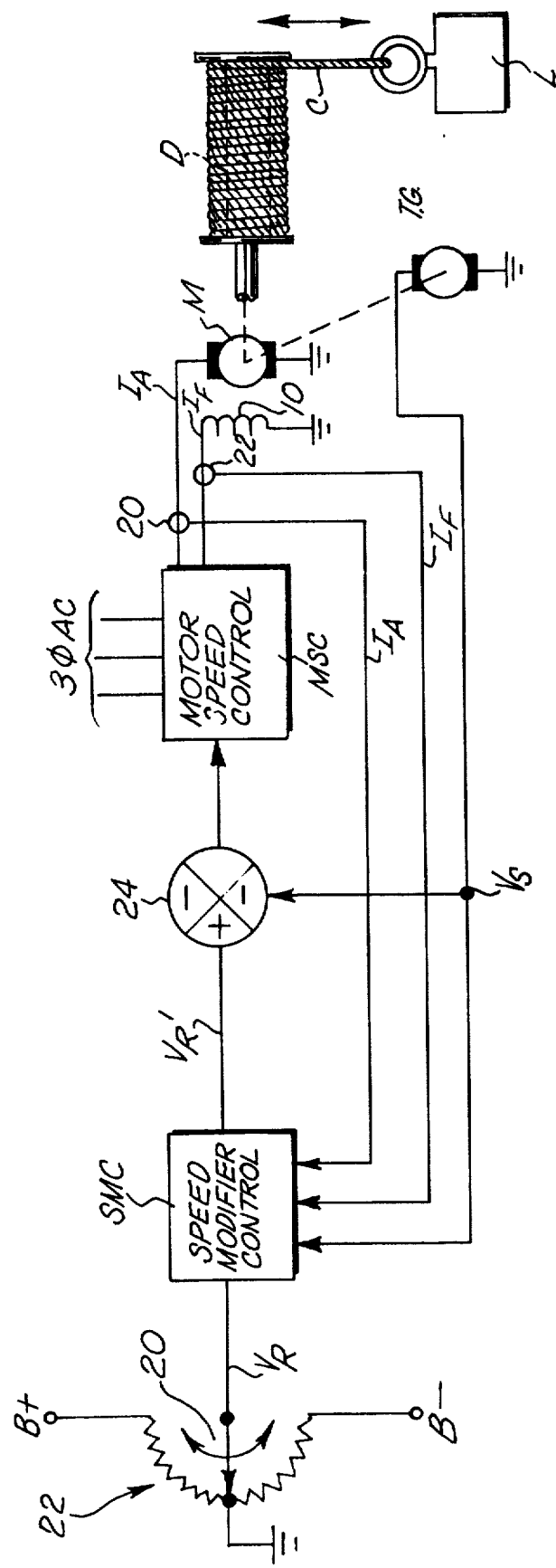
FIG. 1 is a schematic-block diagram illustration of one application of the invention as applied to a crane motor control.

Referring now to the drawings wherein the showings are for purposes of illustrating a preferred embodiment of the invention only and not for purposes of limiting same, FIG. 1 illustrates a crane motor control circuit for lifting and lowering a load L. The load L is coupled to one end of a cable C extending from a drum D driven by a direct current motor M. This motor may take the form, for example, of a conventional reversible shunt wound D.C. motor having an armature winding (within the motor M) for receiving armature current $I_A$ and a shunt wound field winding 10 for receiving field current $I_F$. The motor speed and direction is controlled by a motor speed control circuit MSC. This is a conventional control circuit and, for example, may take the form as described and illustrated in U.S. Pat. No. 3,421,065 issued to L. Stabile on Jan. 7, 1969. Briefly, such a control circuit will operate to control motor M in dependence upon the difference between a reference signal and a measured speed signal. The measured speed signal may be obtained from the armature voltage or with a direct current tachometer generator TG coupled to motor M. This provides a direct current voltage signal $V_S$ exhibiting a magnitude corresponding with motor speed and exhibiting a polarity corresponding with motor direction. The reference signal $V_R$ may be obtained from the wiper arm 20 of a potentiometer 22.

Potentiometer 22 is illustrated herein as being a center tapped potentiometer having its opposite ends respectively connected to a B+ and a B− direct current voltage supply source. Consequently then, the reference speed signal $V_R$ may be of positive or a negative polarity commanding forward or reverse motor operation. The magnitude of the signal commands motor speed. The speed reference signal $V_R$ and the measured speed signal $V_S$ are compared, as with a summing junction 24, which may be conventionally comprised of summing resistors, for purposes of providing an error signal $V_E$ having a polarity in dependence upon the signal comparison and a magnitude in dependence upon the signal difference. This error signal is applied to the motor speed control circuit MSC. The motor speed control circuit also receives power from a three phase alternating current voltage supply source and in dependence upon the error signal $V_E$ operates to control the speed and direction of motor M by controlling the field current $I_F$ and the armature current $I_A$ in a known manner.

As is conventional, motor M operates over a speed range hacing available torque, $T$, in all directions as defined by the expression:

$$T = k_t T_A T_F$$

(Equation 1)

where:
$I_A$ = armature current
$I_F$ = field current
$k_t$ = a constant

Thus, the available torque is proportional to the product of the armature current and the field current. In a field weakened speed range, the available torque will be reduced. At speeds above the base speed of the motor, the field current is less than that required for the base speed and, hence, the available torque will be reduced. The motor speed, $N$, may be obtained from the conventional motor equation expressed below:

$$N = k_N \frac{(V_A - I_A R_A)}{k_f I_F}$$

Figure 2:
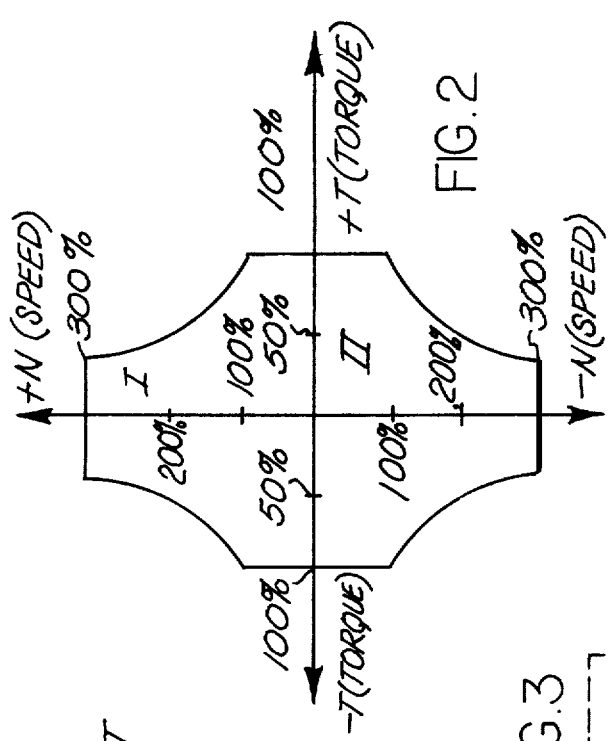
FIG. 2 is a graphical illustration of an ideal speed-torque curve of motor operation for the motor employed in the circuitry of FIG. 1.

(Equation 2)

where:
$k_N$ = a constant (speed)
$V_A$ = armature voltage
$I_A$ = armature current
$R_A$ = armature resistance
$k_f$ = a constant (field flux)
$I_F$ = field current Reference is now made to the ideal speed versus torque plot of FIG. 2 presented for motor M in accordance with equations 1 and 2. Quadrants I and II may be referred to with respect to the operation of a motor when employed in a hoisting operation. Quadrant I represents the ideal speed versus torque relationship during lifting operations whereas quadrant II represents that for lowering operations. If the crane is supporting a load at zero speed, the developed torque is proportional to the tension in the cable and/or the weight of the load. If the torque is 100% at a standstill, then the maximum lifting rate will be 100% speed (see quadrant I in FIG. 2) and the maximum lowering rate will be 100% speed (see quadrant II in FIG. 2). If the operator adjusts the speed reference signal to command more than 100% speed in lowering, the available torque will reduce because the field current $I_F$ will be lessened. The crane will lose control because the load will accelerate in a downward direction under the influence of gravity and will not stop until it strikes ground. If the crane must lift a weight that requires 50% of the available torque, the maximum lifting rate (see quadrant I in FIG. 2) will be 200% rated speed because the motor just does not have the required torque at speeds greater than 200%. Consequently, when lowering the load, the motor speed must be kept at 200% or less in order to be within the available speed-torque limitations. If, however, the operator increases the reference speed signal to call for an increase in the lowering speed to, for example, 210% of rated speed, then the restraining motor torque would be on the order of 95% of its former value (50% of the available torque). Since the available torque has been decreased so as to be outside of the speed-torque locus of FIG. 2, the load will cause the crane to accelerate out of control in a downward direction.

In accordance with the present invention, the speed reference signal $V_R$ is modified in such a manner that the load torque is always within the speed-torque locus (FIG. 2) of the drive. This is achieved by measuring the available torque and comparing it with a speed limiting signal provided by a function generator for purposes of developing a speed reference modifying signal for modifying the speed reference signal $V_R$ during lowering conditions (quadrant II in FIG. 2) to maintain the load torque within the speed-torque locus. This control is achieved with the speed modifier control circuit SMC illustrated in detail in FIG. 3.

The speed modifier control circuit SMC includes a torque measuring circuit TM, a function generator circuit FG and a signal comparison circuit CC. As will be brought out in the description which follows, the speed modifier control circuit SMC is inoperative during crane lifting operations. Also, during crane lowering operations within the speed-torque locus (quadrant II of FIG. 2) no modification is made to the speed reference signal $V_R$.

Figure 3:
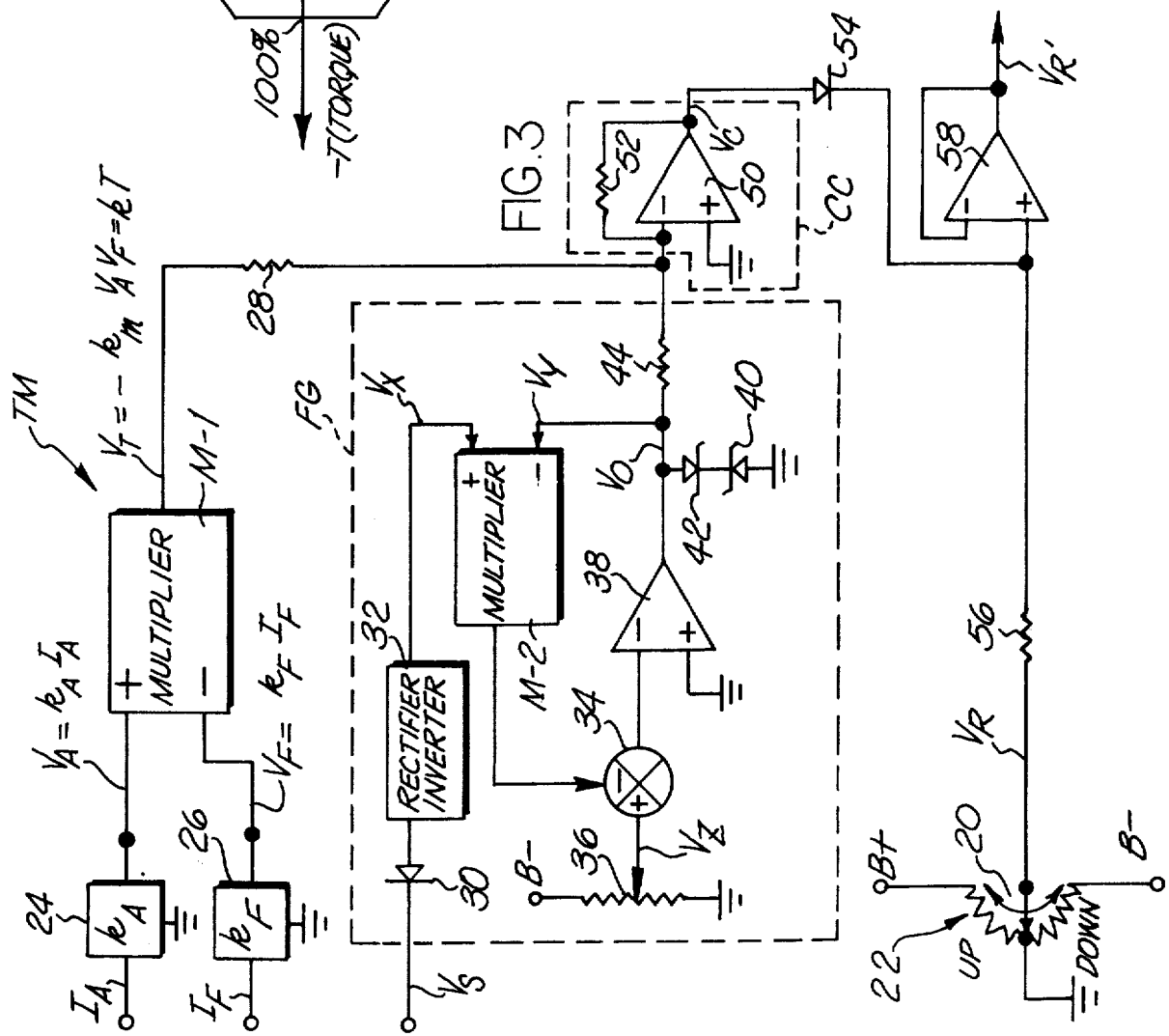
FIG. 3 is a schematic-block diagram illustration of the speed modifier control constructed in accordance with the present invention; and, FIG. 4 is a graphical illustration of voltage with respect to speed illustrating the variation in the magnitude of the modifying or speed reference overriding signal provided by the circuitry of FIG. 3.

The motor torque $T$ may be measured as by utilizing a mechanical torque measuring device. The torque can also be determined by sensing the field current $I_F$ and the armature current $I_A$ since, as will be recalled from equation I, the motor torque is proportional to the product of the armature current and field current. Preferably, the motor torque is measured by sensing the field current and the armature current and this may be accomplished (see FIG. 1) with the use of current sensors 20 and 22 respectively located in the armature circuit and the field circuit. Conventionally, such sensors employ current transformers so that the measured armature current $I_A$ and the measured field current $I_F$ accurately reflect the actual values of the armature current and the field current. The torque measuring circuitry TM employed in FIG. 3 provides a direct current voltage signal $V_T$ having a magnitude representative of the measured torque. It is for this reason that the measured armature current $I_A$ is converted into a proportional voltage signal $V_A$ and the measured field current $I_F$ is converted into a proportional voltage signal $V_F$ by respectively associated signal converters 24 and 26. These signal converters may, for course, take the form of resistors connected between the input terminal and ground to develop the voltage signals. Voltage signals $V_A$ and $V_F$ are applied to a conventional multiplying circuit M-1 to develop an output signal $V_T$ which has a magnitude proportional to the motor torque $T$. This output signal provides information as to the cable tension which is equal to the load weight at standstill as well as off the ground. The torque voltage signal $V_T$ is applied through a resistor 28 to the comparison circuit CC. In the embodiment illustrated, the magnitude of this signal varies linearly from zero volts at zero torque to 10 volts at 100% torque.

Figure 4:
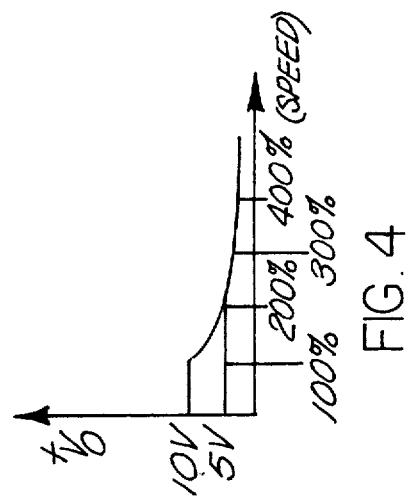

The function generator circuit FG serves to provide a speed modifying control signal $V_O$ which, as illustrated in FIG. 4, has a fixed value for speeds up to 100% and then decreases exponentially with respect to increased speed. Thus, with reference to the speed-torque locus of FIG. 2, the base speed for 100% rated speed corresponds with a maximum of 100% of available torque. The control signal $V_O$ is obtained with the function generator FG to be described below.

The function generator FG includes circuitry for providing a signal having a magnitude which varies with the lowering speed of the crane motor. Although this may be accomplished in various ways, it preferably includes circuitry for receiving the tachometer generator speed signal $V_S$, which is of a polarity and magnitude in dependence upon the direction and velocity of the motor. During hoisting operations, the polarity of the speed signal $V_S$ is positive and is blocked by a diode 30. Consequently then, only negative signals corresponding with crane lowering operations are passed by the diode to a rectifier inverter circuit 32. This circuit provides a positive output voltage $V_X$ having a magnitude which varies linearly with speed and is adjusted so as to provide a signal of a specific amount corresponding with 100% base speed. In the embodiment illustrated, the magnitude of $V_X$ at 100% base speed is set at +2.5 volts D.C. The signal varies from a magnitude of zero corresponding with a zero speed and increases linearly so that at 200% base speed, the signal has a value of +5.0 volts and so on. This speed signal is applied to the positive input of an analog signal multiplying circuit M-2.

The output of the multiplier circuit M-2 is applied to the negative or subtracting input of a summing junction 34. The positive input to the summing junction is obtained from a potentiometer 36. This potentiometer includes a resistance portion connected between ground and a B- voltage supply source. This provides a negative reference signal $V_Z$ with the signal being initially adjusted so that it exhibits a given magnitude, for example, −10 volts D.C. The output from the summing junction 34 is applied to the inverting input of an operational amplifier 38 having its noninverting input connected to ground. The output voltage $V_O$ taken from the operation amplifier 38 is clamped to value of + or −10 volts D.C. by back-to-back connected Zener diodes 40 and 42. This output signal $V_O$ is applied as an input to the negative input of the multiplying circuit M-2 and is also applied through a resistor 44 to the inverting input of the comparator circuit CC.

The effect of placing the multiplying circuit M-2 in the feedback loop of the operational amplifier is such that the output voltage $V_O$ may be expressed as:

$$V_O = K_D \times \frac{V_Z}{V_X} \qquad \text{(Equation 3)}$$

where $V_X$ is a D.C. signal varying between 0 volts and +10 volts, $V_Z$ is set at −10 volts, and $k_D$ is a constant. Since $V_X$ varies in a linear manner and is set so that it is at a voltage of 2.5 volts at 100% base speed, then the value of $k_D$ is 2.5. Consequently then, at zero speed, and applying formula 3 above: $V_O = (+2.5)(10/0) =$ infinity. However, the output of the operational amplifier is clamped to + or 3110 volts and at zero speed, the output voltage $V_O$ is +10 volts. Applying the same formula, it is seen that at 100% speed, $V_O$ is also +10 volts. The output voltage $V_O$ is maintained at +10 volts between zero speed and 100% base speed. At 200% base speed, the value of $V_X$ is five volts and hence, the value of $V_O$ is +5 volts or one-half of its maximum value. This is shown by the graph of FIG. 4 where $V_O$ continues to decrease inversely with increases in speed.

A comparison is made of the measured torque signal $V_T$ and the control signal $V_O$ by the comparing circuit CC. This circuit includes an operational amplifier 50 having its noninverting input connected to ground and its inverting input connected to the junction of resistors 28 and 44. The operational amplifier employs a resistive feedback path including a resistor 52 connected between its output circuit and its inverting input circuit. The output signal obtained from the comparison circuit is referred to as control signal $V_C$. When this signal is negative relative to the reference signal $V_R$, diode 54 is reverse biased. This is true when the crane is in a lifting mode of operation and when the crane is in a lowering mode of operation and the speed-torque relationship is within the locus of quadrant II in FIG. 2. When the control signal $V_C$ is positive relative to the reference signal $V_R$, diode 54 is forward biased. This may take place during crane lowering operations when the lowering speed has increased to the point that the available torque is less than that required to maintain the speed-torque relationship within the locus of quadrant II in FIG. 2. During such conditions, the control signal $V_C$ forward biases diode 54 and effectively modifies the reference signal $V_R$. During lowering conditions, the reference signal $V_R$ is a negative signal commanding downward movement of the crane. This negative signal is reflected through resistor 56 and is made less negative (more positive) by the effect of the more positive control signal $V_C$. This is applied to a voltage follower circuit including operational amplifier 58 which provides the modified speed reference signal $V_R'$.

As shown in FIG. 1, the modified speed reference signal $V_R'$ is applied to the summing junction 24 for comparison with the speed reference signal $V_S$. The error signal $V_E$ is applied to the motor speed control circuit MSC. When the control signal $V_C$ operates to modify the speed reference signal to make it more positive (less negative), the motor speed will stop increasing its downward rate to a speed that is inside the crane motor speed-torque locus of FIG. 2.

As the crane is lowering the load L at a speed less than 100%, the control signal $V_O$ will be clamped at a value on the order of +10 volts. So long as the motor torque is less than 100%, diode 54 will be reversed biased and the control signal has no affect on the crane speed control. However, as the crane speed is increased in the lowering direction beyond base speed, the output voltage $V_O$ will decrease, causing the control voltage $V_C$ to become more positive (less negative). As this condition continues, control voltage $V_C$ will attain a level so as to be more positive than the reference signal $V_R$ to thereby forward bias diode 54. This will effectively cause the speed reference signal to become more positive (less negative). This will cause the crane to stop increasing its downward rate of travel to a speed that is inside the speed-torque locus (quadrant II of FIG. 2). When the load is being raised by the crane, the speed signal $V_S$ is positive to reverse bias diode 30.

Although the invention has been described in conjunction with a preferred embodiment, it is not limited to same as various modifications and arrangements may be made within the scope of the appended claims.

I claim:

1. A motor control system for a D.C. motor having a field and armature and exhibiting available torque over a motor speed range within a desired speed-torque relationship and comprising:
   means for providing a motor speed signal representative of actual motor speed,
   means for providing a speed reference signal representative of a desired motor speed,
   motor speed control means for controlling energization of said motor to operate at a motor speed dependent upon a given relationship of said motor speed signal and said reference speed signal, and
   speed modifier control means including means for providing a torque signal representative of the available motor torque, and means for effectively varying said reference speed signal to reduce said motor speed only when said motor operates in a field weakened speed range and the available torque is less than that required for the motor speed to be within said desired speed-torque relationship.

2. A motor control system as set forth in claim 1 wherein said speed control means includes means for providing a control signal having a value dependent upon motor speed, and means for providing a modifying signal dependent upon the values of said motor torque signal and said control signal.

3. A motor control system as set forth in claim 2 including circuit means for receiving said speed reference signal and said modifying signal for deriving a modified speed reference signal for application to said motor speed control means to decrease said motor speed.

4. A motor control system as set forth in claim 2 wherein said torque signal providing means including means for measuring the actual available motor torque developed by said motor as said motor speed is varied.

5. A motor control system as set forth in claim 4 wherein said torque measuring means includes circuit means for developing a first signal having a magnitude dependent upon the value of the energizing field current for said motor and for developing a second signal having a value dependent on the magnitude of the motor armature current and developing therefrom a said torque signal having a value proportional to the product of said first and second signals and, hence, to the available motor torque.

6. A motor control system as set forth in claim 5 wherein said circuit means includes current sensing means for respectively sensing the motor field current and the motor armature current and signal converting means for providing said first and second signals in dependence upon the value of said field current and said armature current, and signal multiplying means for receiving said first and second signals to develop said torque signal having a magnitude which is proportional to the product of the magnitudes of said sensed field current and said sensed armature current.

7. A motor control system as set forth in claim 2 including circuit means for developing said control signal such that it varies inversely with speed only when the motor speed exceeds a predetermined amount.

8. A motor control system as set forth in claim 7 wherein said control signal developing means includes operational amplifier means, multiplying circuit means defining a feedback path between the output circuit and the inverting input circuit of said operational amplifier means, said multiplying means including circuit means for receiving said motor speed signal for multiplying the output of said operational amplifier means thereby, summing circuit means for developing a difference signal dependent upon the difference between said multiplied output signal from said multiplying means and a reference signal and supplying said difference signal to the inverting input circuit of said operational amplifier means.

9. A motor control system as set forth in claim 2 including circuit means for receiving said torque signal and said control signal and supplying a signal representative of a given relationship therebetween to said comparing means, said comparing means having an output circuit for carying a said modifying signal having a value dependent upon said given relationship.

10. A motor control system for controlling the motor speed of a D.C. motor having a load thereon and wherein said motor operates within a desired speed-torque relationship over an operating speed range and comprising:
    means for providing a motor speed signal representative of actual motor speed,
    means for providing a speed reference signal representative of desired motor speed,
    motor speed control means for controlling energization of said motor to operate at a motor speed dependent upon a given relationship of said motor speed signal and said reference speed signal, and
    speed modifier control means operative only during regenerative motor conditions for maintaining said motor speed within the desired speed-torque relationship of said motor and including circuit means for effectively measuring the load and means for modifying said reference speed signal in dependence on said measured load to reduce said motor speed when the motor speed exceeds that required for the available torque as determined by the measured load.

11. A motor control system as set forth in claim 10 wherein said means for effectively measuring the load includes circuit means for developing a torque signal in dependence upon the magnitude of the actual motor torque developed, function generator means for developing a control signal having a value dependent upon actual motor speed and means for varying said reference signal in dependence upon the relative magnitudes of said torque signal and said reference signal to maintain said motor speed within the desired speed-torque relationship.

12. A motor control system as set forth in claim 10 wherein said load is a weight and is interconnected with said motor, said motor being a reversible drive D.C. motor to provide lifting torque over a given speed range for lifting said weight and restraining torque over a given speed range for lowering said weight, said means for providing a speed reference signal includes means for providing a signal exhibiting a first polarity representative of commanded motor lifting operation and a second polarity representative of commanded motor lowering operation and said motor speed control means includes circuit means for responding to the polarity and the magnitude of said speed reference signal for operating said motor in a motoring mode or in a regenerative mode for respectively raising or lowering said load at a speed in dependence upon the magnitude of said reference signal.

13. A motor control system as set forth in claim 12 wherein said speed modifier control means includes circuit means for varying said reference signal only when said motor operates in a said regenerative mode and the motor speed exceeds that required for the available torque to be with the said desired speed-torque relationship.

* * * * *